United States Patent [19]

Grant

[11] 4,381,850
[45] May 3, 1983

[54] AUTOMATIC AIR REGISTER DAMPER

[76] Inventor: Willie T. Grant, 400 S. Simms St., Lakewood, Colo. 80228

[21] Appl. No.: 312,339

[22] Filed: Oct. 16, 1981

[51] Int. Cl.³ .............................................. F24F 13/10
[52] U.S. Cl. ......................................... 236/11; 236/49
[58] Field of Search .............................. 236/49, 11, 84

[56] References Cited

U.S. PATENT DOCUMENTS

| | | | |
|---|---|---|---|
| 2,271,487 | 1/1942 | Nessell | 236/11 X |
| 2,274,614 | 2/1942 | Nessell | 236/11 X |
| 2,284,674 | 6/1942 | Murdock | 236/11 X |
| 2,401,004 | 5/1946 | Lehane et al. | 236/84 X |
| 2,521,866 | 9/1950 | Ott | 236/11 X |
| 2,523,497 | 9/1950 | Copping | 236/49 |
| 2,814,977 | 12/1957 | Noll | 236/49 X |
| 2,975,975 | 3/1961 | Weber | 236/49 |
| 3,297,250 | 1/1967 | Capps | 236/11 X |

Primary Examiner—William E. Tapolcai

[57] ABSTRACT

An automatic damper device constructed to be integrated in multiple units into forced air heating and cooling systems for the purpose of controlling and regulating air flow to all rooms, individually and concurrently, within a dwelling; the automatic damper means incorporating a damper housing having a rotatable damper plate connected by flexible cable to dual solenoid motor means that are energized through dual switch means. Damper housing is installed in duct boot terminating in room register, and damper plate is rotatable between open and closed positions by said cable means attached to common solenoid plunger when automatic damper device responds to commands from associated room thermostat that controls damper motor means and combustion cycle of combustion means.

10 Claims, 6 Drawing Figures

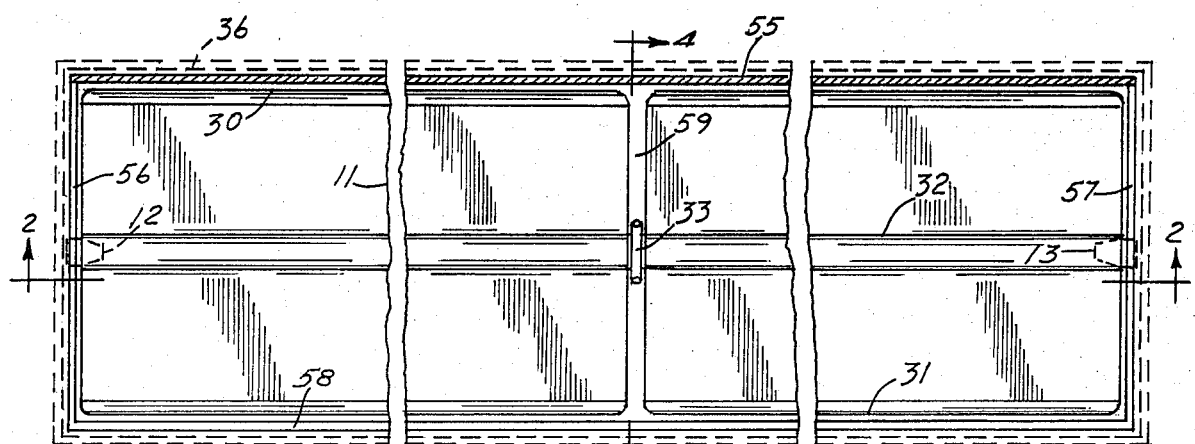
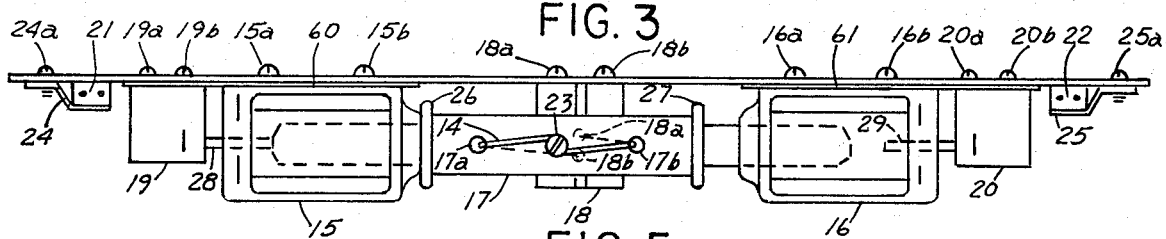
FIG. 3
FIG. 5
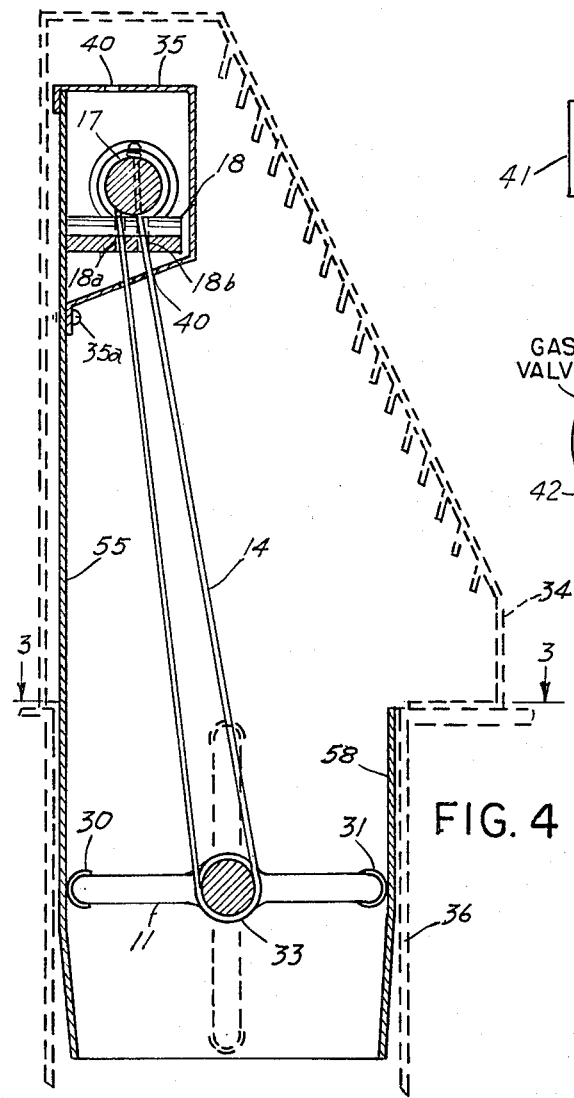
FIG. 4
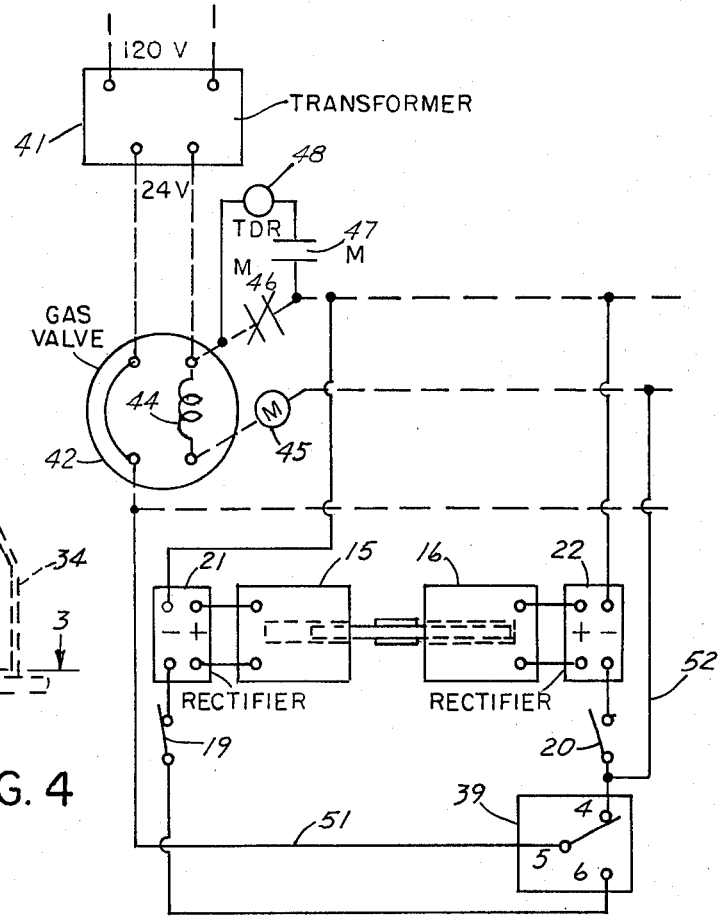
FIG. 6

AUTOMATIC AIR REGISTER DAMPER

SUMMARY AND DETAILED DESCRIPTION

There are a number of automatic damper devices in existence. However, the known devices are designed to regulate air flow and control temperatures in multizoned buildings or to regulate the heating medium as it passes through the furnace ducts but prior to said medium reaching room register. The air flow and temperature control systems designed for use in multizoned buildings are somewhat complex for economical utilization in single family dwellings. Existing dwellings having ducts installed between floor or ceiling joists and between wall studs do not permit easy installation of automatic dampers that require placement within the duct proper.

The most common room register device requires manual adjustment of the associated damper means. When said damper is completely closed, little heated air is transmitted to subject room during the furnace heating cycle, and said room remains unheated until aforesaid damper means are manually opened.

The subject automatic damper device overcomes these and other limitations of existing damper devices by providing an automatic damper control means within the furnace duct termination within subject room. The present device, being installed in the open ended duct termination and housed within the confines of existing or new air registers, commonly on the market, is automatically controlled by thermostatic means peculiar to each room and subject damper means.

The advantages of the present device include simplicity of installation within the exposed open ended duct terminations, economy in capital costs and installed costs, control of individual room temperatures and air flow through automatic damper control means electrically connected to furnace control means. By heating or cooling individual rooms to different temperatures based on use of said room, the present device can substantially reduce heating and air conditioning costs. The cost savings and the gain in more efficient use of heating and air conditioning equipment are incurred without major changes or modifications to existing equipment.

The subject damper means incorporate a damper plate mounted to rotate between a closed position, substantially restricting flow through the furnace duct and an open position permitting substantially unrestrained flow therethrough. Through solenoid means, the damper control means are electrically connected to the room thermostat and to the furnace control means or to a like heating or cooling device. When said furnace control means are energized, the furnace fuel means are activated and the related solenoid means are simultaneously energized. The damper plate, operatively connected to the solenoid means, rotates to its open position through linear movement of the solenoid plunger. As that end of the plunger which is related to the energized solenoid is seated, the aforesaid plunger movement causes the normally closed switch associated with subject solenoid to open and urges the switch related to the de-energized solenoid to its closed position. Subject damper remains biased to the open position until the room thermostat is satisfied, whereupon the thermostatic switch means open to deenergize the furnace control means and energize the opposite solenoid, thereby urging the plunger to rotate the damper to its closed position by means of the linear movement of the attached cable. The said plunger movement simultaneously causes the switch means of the presently energized solenoid to open and permits the switch related to the solenoid for the open damper position to close in preparation for the next cycle.

It is preferred that the materials of construction for the subject damper means be rust and corrosion proof and be capable of withstanding a temperature range normally associated with forced air heating and cooling systems without suffering malfunctions, breakdowns, and frequent maintenance requirements. The present invention is constructed to provide a smooth flow path for the heating medium with minimal obstruction to flow.

One of the principal objectives of the present invention is to selectively provide conditioned air (heated or cooled) to individual rooms within a dwelling served by a central air conditioning unit, such as a furnace or like device.

Another objective is to reduce the operating cost associated with furnaces, cooling units, and other like devices used in conditioning the warming or cooling medium.

Another objective is to reduce fuel consumption in furnaces, cooling units and similar devices.

Another objective is to incorporate an automatic damper means in the duct boot within each room of a dwelling and significantly increase the efficiency and operating life of furnaces and like devices.

Another objective is to provide an automatic damper device which remains closed, thereby restricting air flow from furnace to the room whenever room temperature equals or exceeds the thermostat setting.

Another objective is to provide a relatively inexpensive automatic damper device for installation in new and existing open ended duct boots.

Another objective is to provide an automatic damper device which can be opened or closed during heating cycle of furnace of like device.

Another objective is to provide an automatic register damper means which resist rust and corrosion and operate within the normal temperature ranges for residential furnace and air conditioning equipment.

Another objective is to provide an automatic damper means having minimal maintenance and repair requirements.

Another objective is to provide an automatic damper means having a safe electrical interlock with furnaces and like devices.

Another objective is to provide automatic damper means with quiet operational characteristics.

These and other objects and advantages of the present invention will become apparent after considering the following detailed specification and accompanying drawings which cover a preferred embodiment, wherein:

FIG. 3 is a fragmented, cross-sectional view along line 3—3 of FIG. 2;

FIG. 4 is a cross-sectional view taken along line 4—4 of FIG. 3;

FIG. 5 is a detailed view showing motor means;

FIG. 6 is a circuit diagram of the present invention including showing the electrical connections to an associated furnace device.

Figure 1:
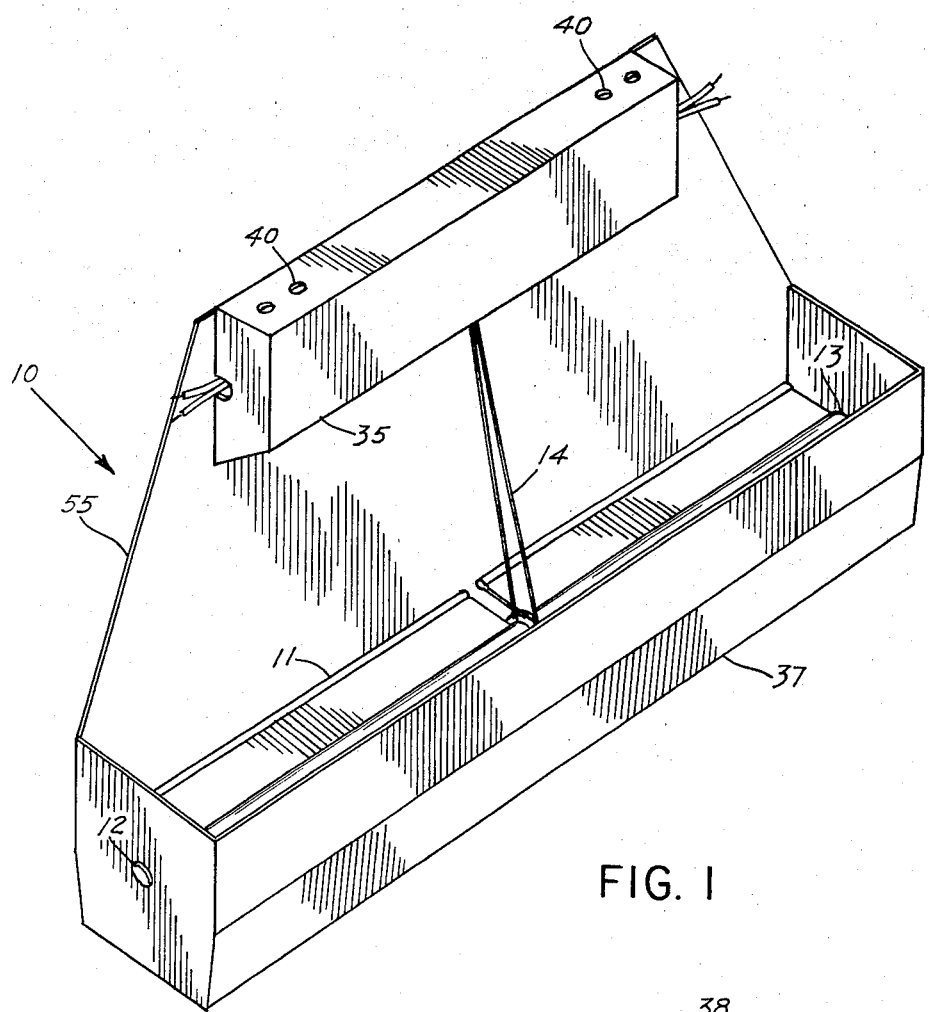
FIG. 1 is a perspective view of automatic damper means constructed according to the present invention.

Referring to the views more specifically by reference numbers, FIG. 1 shows an automatic damper device 10 constructed according to the present invention. The subject device includes a damper housing 37 to be installed in a furnace duct boot 36 or like facility shown in dashed outline and a motor means 38 connected to the upper portion of the rear panel 55 of damper housing 37 shown in FIG. 2. A rotatable shaft 32 integral with damper plate 11 and supported on bearing pins 12 and 13 in the end panels 56 and 57 of the damper housing 37 extends along the full length of damper housing axis. Said rotatable shaft 32 bisects the space between the rear panel 55 and front panel 58 of said damper housing and has damper plate 11 integrally formed along longitudinal axis of said shaft. Damper plate 11 thereby rotates with subject shaft between open and closed positions to be explained. When biased to the closed position, the damper plate with attached noise suppression means 30 and 31 engage front and rear panels of damper housing 37 for the purpose of substantially restricting air flow through the space controlled by the damper means thereby negating air movement into associated room. Said damper plate 11 is shown in closed position by solid line representation in FIG. 4 and in an open position by the dashed outline.

The automatic damper device 10 is constructed to be mounted in the open ended boot of a furnace duct and includes damper housing 37 which is rectangular in shape. In order for said housing to be inherently rigid for the purpose of maintaining the original cross-section throughout its service life, subject housing is preferably constructed from rigid, heat resistant and fire retardant plastic material or from heavy gauge steel or like material coated with baked-on enamel to present a pleasing appearance.

Figure 2:
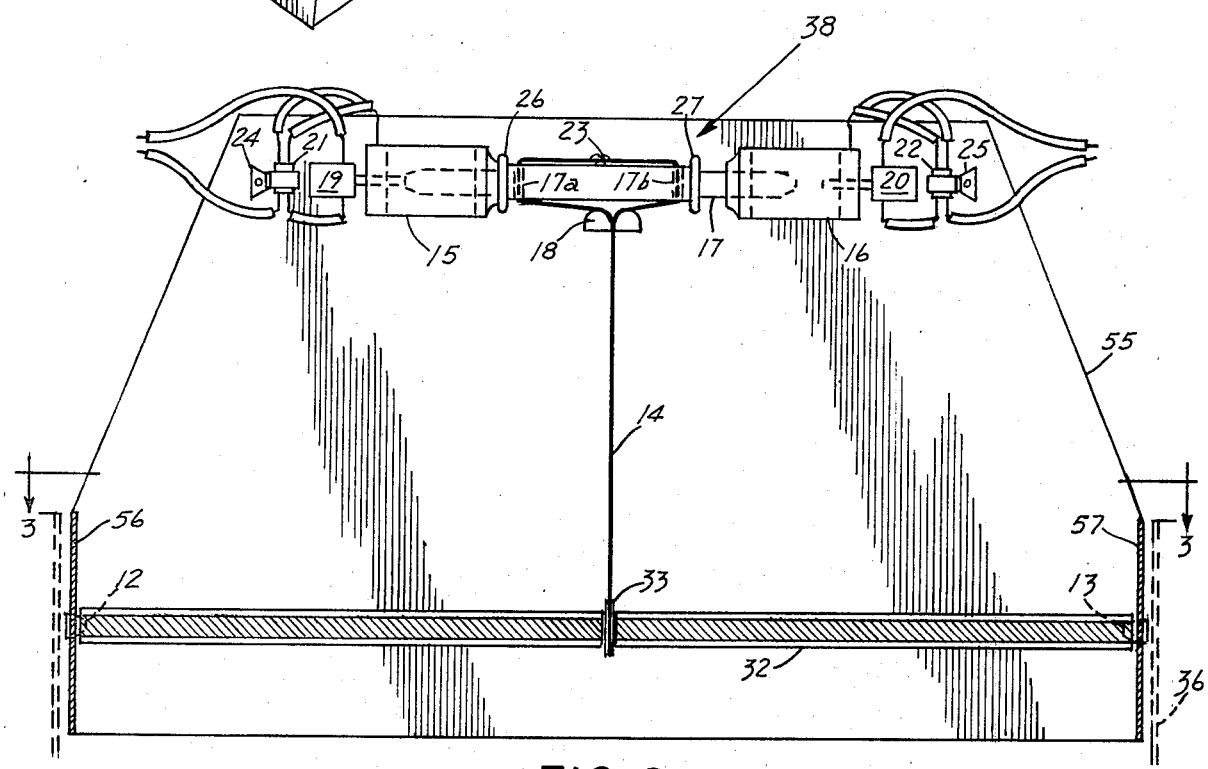
FIG. 2 is a cross-sectional elevational view taken along line 2—2 of FIG. 3 with cover plate omitted for clarity.

As shown FIGS. 2 and 4, the rear panel 55 extends above the top of end panels 56 and 57 and front panel 58 for the purpose of attaching the motor means thereto. However, in the same manner as the front panel, the lower extremity of the rear panel 55 possesses a taper biased toward the inside of subject housing for ease of installation when mating with said duct boot 36. Each end panel (56 and 57) contains a hole of proper diameter to receive bearing pins 12 and 13 which are constructed of a low coefficient of friction material, such as Teflon, and said pins cooperate to engage the ends of rotatable shaft 32 with integrally formed damper plate 11. Shaft 32 incorporates pulley 33 inherently formed at the longitudinal mid-point of said shaft and damper plate for the purpose of capturing cable 14 which serves to rotate the combined unit.

Said damper plate 11 being essentially one continuous section, has an interruption along the longitudinal axis, (FIG. 3), created by slot 59 running perpendicular to said axis for the prescribed purpose of providing clearance and freedom of movement for cable 14 during operation of damper means. When said cable urges shaft 32 to rotate in a clockwise direction, such rotation moves damper plate 11 to the open position, whereby, said open damper cooperates with furnace means in the transfer of conditioned air through register 34 into subject room which is required to be heated or cooled. Rotation of the damper means in a counter-clockwise direction biases said damper mechanism to the closed position. Subject combination damper plate 11 and shaft 32 are preferably constructed from materials which can operate maintenance free over long periods of time in an atmosphere common to furnace ducts and like devices.

When said damper plate 11 resides in said closed position, a relatively compressible sound dampening and cushioning material 30 and 31 attached respectively to the opposite edges of said damper plate engages front and rear panels 58 and 55 of damper housing 37 and cooperates in quietly arresting damper plate and assists in restricting air flow through damper means. The compressible cushioning means is preferably constructed from a material such as silicon rubber or like material normally not affected by the range of temperatures associated with residential heating and cooling equipment. Said cushioning means are specially shaped to slip over leading edges of damper plate 11 and be secured to said edges by compatible bonding material.

As shown in FIGS. 2 and 4, cable 14 provides the connection between the damper means and the motor means. Flexibility of the heatresistant cable permits said cable to be wrapped around shaft 11 at the pre-formed pulley location to ensure development of frictional drag forces that will rotate the damper plate without slippage. Said cable 14 extends in an upward direction until intercepted by the directional changer 18 of the control means 38 where holes 18a and 18b guide cable 14 through said changer and said cable subsequently passes over the semi-circular top extremity of subject directional changer 18, thereafter paralleling multi-diametered solenoid plunger 17 prior to turning upward through holes 17a and 17b whereupon the exiting ends of cable 14 terminate around screw 23 which tightens into mating hole in the top of said plunger 17 and secures both ends of subject cable.

In addition to plunger 17 and directional changer 18, the motor means 38 include other noise suppression means 60 and 61, DC solenoid means 15 and 16, shown in FIG. 5, which are respectively attached to rear panel 55 of damper housing 37 by means of fasteners 15a, 15b, and 16a and 16b, switch means 19 and 20 which are respectively attached to said panel by fasteners 19a, 19b, and 20a, 20b, current rectifiers 21 and 22 which are attached to aforesaid housing panel by means of holders 24 and 25 through associated fasteners 24a and 25a. Sound dampening means 26 and 27 are held in place by frictional forces developed through the close fit existing between said sound dampeners and the solenoid plunger to which dampers 26 and 27 are attached. Said plunger 17 is comprised of a continuous rod common to solenoids 15 and 16 and having a central portion whose diameter exceeds the end diameters for the purpose of providing bearing surfaces for sound dampeners 26 and 27.

In the process of being energized by the AC source, the motor means operate the damper means through interconnecting cable 14 thereby permitting movement of heated or cooled air into subject room in response to the demands of thermostat means 39 of FIG. 6. More specifically, when solenoid 16 becomes energized, plunger 17 is drawn into the solenoid coil causing cable 14 to move with said plunger whereupon said cable rotates shaft 32 in a clockwise direction thereby opening damper 11. As plunger 17 approaches its seating position, the extremity of subject plunger engages rod 29 of switch means 20 and forces said rod to disconnect the circuit heretofore energizing solenoid 16. Sound dampening ring 27 terminates the final inertial movement of plunger 17 as said ring contacts and compresses against face of subject solenoid. Damper plate 11 remains biased to the open position until the thermostatic means has been satisfied, at which time the thermostat switch means cause solenoid 15 to be energized and plunger 17 is persuaded to execute an identical, but reverse procedure to close damper 11. In the reverse procedure, thermostat 39 influences participation of solenoid 15, plunger 17, switch means 19, sound dampener 26, and all other associated mechanisms required to cooperate in closing damper 11, thereby restricting further air flow through the damper means and into subject room.

As shown in FIG. 4, cover plate 35, attached to frame assembly 37 by fasteners 35a, encloses the motor means 38 and protects the control mechanism contained therein while adding to the appearance of the device. Holes 40 are provided in the top and bottom of said cover plate to permit flow of air around solenoids 15 and 16. On the basis of the limited amount of time each solenoid is energized, heat buildup in the coils will be negligible under normal operating conditions. Should a malfunction occur, however, and a solenoid remain energized for a long period of time, heat dissipation will become necessary, and holes 40 will allow that dissipation to occur.

The electrical circuits that energize the preferred embodiment are shown in FIG. 6 with solid lines showing wiring of invention being controlled and with dashed lines showing wiring of the associated device like a furnace or other air conditioning means. When damper device 10 is connected to a furnace, power is fed to control means 38 through a stepdown transformer 41 and gas valve 42 which is operated by internal solenoid 44 and controlled by thermostat means 39. When temperature of subject room associated with thermostat 39 falls below the present thermostat temperature, subject thermostat signals gas valve 42 to open and activate furnace means allowing current to flow through the secondary winding of transformer 41 through internal wiring of gas valve 42 and through lead 51 connecting thermostat 39 to said gas valve. Normally closed switch 20 permits AC current to enter rectifier 22 which converts said AC current to DC prior to current arriving at solenoid 16 where stated purpose is to energize subject solenoid and cause plunger 17 to command rod 29 to open switch 20. With switch 20 biased to said open position, current bypasses switch means 20 through conductor 52 leading from thermostat 39 to gas valve solenoid 44 which is kept energized by said current for the purpose of feeding fuel to furnace means until heating cycle is complete. When thermostat 39 has been satisfied, thermostatic switch 5-4 opens with the closing of associated switch 5-6. AC current flows through normally closed switch 19 to rectifier 21, is converted to DC current, and subsequently energizes solenoid 15 thereby closing damper 11 as multidiametered plunger 17 moves to a seated position influencing the opening of switch 19 in the process. Automatic damper devices in the other rooms undergo identical experiences as the furnace means continue to supply heated or cooled air until the last thermostat is satisfied.

When last thermostat is satisfied, its internal thermostatic switch 5-4 opens thereby de-energizing magnetic coil 45 and urging normally closed contacts 46 to an open position and normally open contacts 47 to a closed position while activating the time delay device 48. The letter "M" associated with said coil 45, contacts 46 and 47 is indicative of the electrical intraconnections within the composite unit. With thermostatic switch 5-6 and circuit switch 19 closed, the pending current flow is through the circuit connecting thermostat 39 and the time delay device 48 which is synchronized with the furnace blower to permit the last damper means to remain in an open position until the residual heated air has been blown from the furnace box. After passage of the prescribed time interval, time delay relay 48 allows current flow through said circuit, thereby energizing solenoids 15 and closing damper 11 through previously described operations.

With the capability to close individual room dampers through separate thermostat settings, use of the subject device permits individual, personal selection of room temperatures and individual maintenance of room comfort thereby resulting in savings in fuel costs in winter and reduced operating costs of air-conditioning means in summer including central air-conditioning equipment such as might be a part of the furnace installation or a separately installed system.

Thus, there has been shown and described a novel automatic damper device which fulfills all the objects and advantages sought after. Many changes, modifications, variations and other uses and applications of the present device will, however, become apparent to those skilled in the art after considering this specification and accompanying drawings. All such changes, modifications, variations, and other uses and applications which do not depart from the spirit and scope of the invention are deemed to be covered by the invention which is limited only by the claims which follow:

I claim:

1. Means for controlling the air flow through individual ducts which transport said air to separate rooms of a multiple room dwelling from a furnace, air-conditioning equipment or like devices and where each said duct has installed in its open ended termination an automatic damper means comprised of a damper housing, noise suppression and cushioning means attached to longitudinal edges of a damper plate for quietly arresting said damper plate pivotally mounted in the damper housing and movable between a closed position, thereby placing said cushioning means against front and rear panels of said damper housing, and an open position which allows substantially unrestricted flow through said duct, rotatable damper support means inserted in holes in end panels of said housing, DC solenoid motor means including cable means that implements rotational movement of a damper shaft attached to said damper plate for opening and closing said damper plate at the command of thermostatic control means, means for rectifying alternating current, said thermostatic control means regulating the combustion cycle of a furnace of like device and causing the motor means to be energized simultaneously with said furnace or like device whereupon said motor means influence rotation of damper plate from a closed position to an open position when the fuel control means are energized and from an open to a closed position when said furnace or like device is de-energized, or when said thermostat control means closes, a dual switch means having switch actuators operated by translational movement of a multi-diametered solenoid plunger common to a set of dual solenoids comprising the aforesaid DC solenoid motor means such that a switch actuator of a normally closed switch of said dual switch means is moved by said plunger to change said normally closed switch to an open switch condition whenever the damper plate is rotated from an open to a closed position or vice versa, the closed switch being a requisite condition for said switch means to establish a closed circuit thereby enabling the furnace or like device to initiate a heating or cooling cycle, and immediately after start of the heating or cooling process, the solenoid plunger moves said switch means actuator to create an open switch condition and de-energization of the previously energized solenoid, and energizes a time delay means that delays closing of the damper plate in the last room to be heated or cooled in said multiple room dwelling until said heating or cooling cycle is complete.

2. The means defined in claim 1 where said noise suppression and cushioning means include a substantially continuous and specially shaped cross-section of relatively compressible sound deadening and cushioning material such as silicon rubber or like material securely attached to the longitudinal edges of the damper plate for arresting said damper plate in a quiet manner as said damper plate comes to rest in a closed position within the damper housing.

3. The means defined in claim 1 wherein said damper housing supports the damper plate and encompasses the space at the open end of said duct for the purpose of controlling communication through said duct by said damper plate operated by said solenoid means under the influence of said thermostatic means, said damper housing having an extended rear panel which fixedly supports said motor means and other noise suppression means, said damper housing having adequate rigidity to resist flexible nature of end of said duct.

4. The means defined in claim 3 wherein said damper housing being substantially rectangular in shape and having said extended rear panel projecting above the top extremity of other panels of said damper housing for securely capturing the solenoid motor means including said switch means, said current rectifying means, and a cable direction changing means, with said solenoid motor means having other noise suppression means positioned between solenoids of said motor means and interior face of extended rear panel.

5. The means defined in claim 1 wherein said motor means are comprised of dual DC solenoids sharing a common, multi-diametered plunger and having said cable means encircling a pulley formed at mid-length of a combined rotatable shaft and damper plate with said cable means extending upward to pass through integral holes in a cable direction changer and over a semi-circular surface of said changer to become attached to said plunger for rotating said damper plate when said motor means move said plunger in response to a command from said thermostatic control means whose function is to control communication through a room register thereby controlling preferred room environment.

6. The means defined in claim 1 wherein said time delay means include a time delay relay and associated electrical contacts that provide a measured time interval during which the damper plate of register in last room to be heated or cooled in a multiple room dwelling remains in an open position after said furnace or like device is shut off to permit residual conditioned air to be blown from said furnace or like device into said room receiving conditioned air.

7. Means including a device for controlling air flow through a duct system of a furnace, air conditioner, or the like device where ducts of said system terminate as open ended tubular sections within room registers, said device having a frame assembly adapted for installation in an open ended duct termination, a damper plate with integral shaft centrally located in a damper housing, said damper plate with integral shaft pivotally mounted to extend the length of a frame assembly with extremities of said shaft supported on low friction pins provided in end panels of said housing, said damper plate and integral shaft movable alternately between open and closed positions where in its closed position said damper plate having sound suppression and cushioning material attached thereto engages a periphery of said damper housing and substantially restricts air flow past said damper plate whereas in the open position said damper plate permits substantially unrestricted flow through the register, motor means mounted on an extended panel of said frame assembly above the damper housing and operatively connected to said shaft through cable means to perform shaft and damper plate rotation between open and closed positions of said damper plate, said cable means including a pulley formed at mid-length of said shaft and a flexible cable encircling the circumference of said pulley and projecting upward through holes in a cable direction changer where said cable means traverses the top of said changer and terminates in a fastened condition atop a multi-diametered solenoid plunger with said plunger comprising the movable portion of a solenoid motor means which are energizable concurrently with control means of said furnace or like device when said furnace control means are operating in accordance with the commands of a room thermostat which regulates the furnace or like device, said solenoid motor means operatively connected to dual switch means through solenoid plunger movements that open and close said switches thereby energizing and de-energizing the motor means as required to rotate said shaft with said damper plate from the present to the preferred position.

8. The means defined in claim 7, said dual switch means being electrically and operatively connected to said motor means for energizing and de-energizing said solenoid means through the movements of said solenoid plunger in response to signals from thermostatic means.

9. The means defined in claim 7 wherein said damper plate is integral with said shaft pivotally mounted in said frame assembly with said shaft having said pulley formed on said shaft at mid-length and said pulley being encircled by said cable means operatively connecting said damper plate to said solenoid motor means wherein said damper plate is rotated when said solenoid motor means are energized by an electrical circuit established by said room thermostat, and said solenoid motor means causes said plunger to translate horizontally thereby urging said connecting cable to rotate shaft and integral damper plate.

10. The means defined in claim 7 wherein the multi-diametered solenoid plunger incorporates a metallic rod capable or responding to a magnetic force, said rod being common to both DC solenoids and having a raised center section that provides bearing surfaces for sound dampeners.

* * * * *